United States Patent [19]

Lester et al.

[11] Patent Number: 5,467,019
[45] Date of Patent: Nov. 14, 1995

[54] METHOD AND APPARATUS FOR BALANCING THE ELECTRICAL OUTPUT OF THE RECEIVER COILS OF AN INDUCTION LOGGING TOOL BY USE OF A SLIDABLE MAGNETIC ROD FOR ELIMINATING DIRECT COUPLING

[75] Inventors: Robert A. Lester; David Beard; Milton E. Cram, all of Houston, Tex.

[73] Assignee: Western Atlas International Inc., Houston, Tex.

[21] Appl. No.: 203,809

[22] Filed: Mar. 1, 1994

[51] Int. Cl.⁶ .............................. G01V 3/10; G01N 27/72
[52] U.S. Cl. ................................ 324/339; 324/239
[58] Field of Search .................... 324/340, 341, 324/342, 343, 345, 346, 329, 338, 339, 239, 241, 242

[56] References Cited

U.S. PATENT DOCUMENTS

| | | | |
|---|---|---|---|
| 2,779,908 | 1/1957 | Martin | 324/329 |
| 3,051,892 | 8/1962 | Huston | 324/339 |
| 3,742,341 | 6/1973 | Clowes et al. | 324/329 |
| 3,882,374 | 5/1975 | McDaniel | 324/329 |
| 4,873,488 | 10/1989 | Barber et al. | 324/339 |
| 4,965,522 | 10/1990 | Hazen et al. | 324/339 |
| 5,138,263 | 8/1992 | Towle | 324/338 |

Primary Examiner—Sandra L. O'Shea
Assistant Examiner—Roger Phillips
Attorney, Agent, or Firm—William A. Knox

[57] ABSTRACT

In an induction logger, a method for nulling the output signal from a pair of series-coupled receiver coils by altering the magnetic flux distribution within the coils by use of one or more magnetic equalization bodies. The shape and aspect ratio of the equalization body are chosen to minimize temperature dependence of the initial permeability. Alternatively, a highly conductive equalization body may be used.

6 Claims, 2 Drawing Sheets

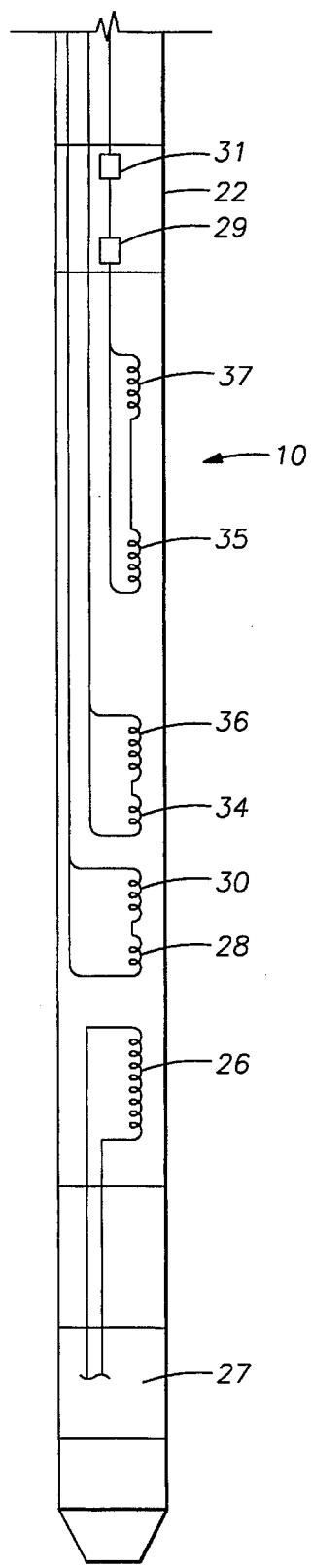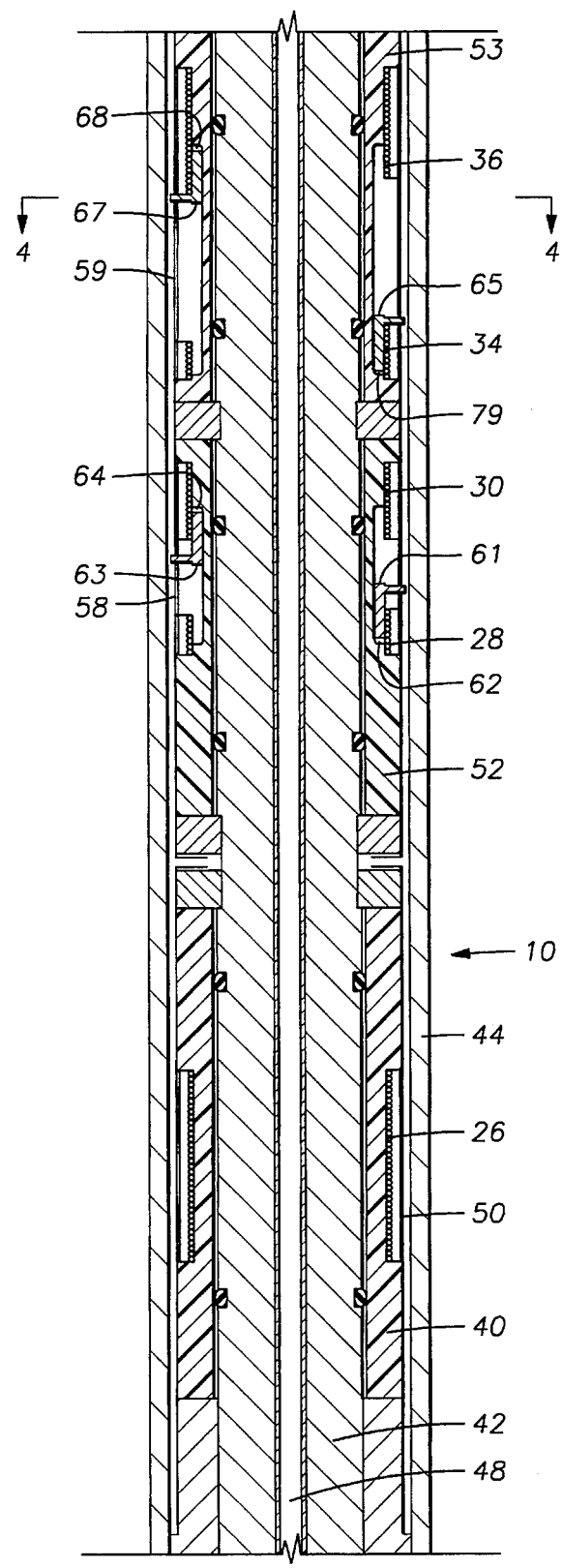

METHOD AND APPARATUS FOR BALANCING THE ELECTRICAL OUTPUT OF THE RECEIVER COILS OF AN INDUCTION LOGGING TOOL BY USE OF A SLIDABLE MAGNETIC ROD FOR ELIMINATING DIRECT COUPLING

BACKGROUND OF THE INVENTION

1. Field of the Invention

This invention is concerned with a method and apparatus for nulling the direct coupled signals detected by the receiver coils of an induction logging tool.

2. Discussion of Related Art

Electromagnetic (induction) logging tools, used for measuring the electrical characteristics of formations penetrated by a borehole, are well known. Typically the tool consists of a sonde that is lowered into a borehole on the end of a supporting cable. An induction logging tool includes a transmitter coil and at least one and preferably a set of receivers that may include at least two spaced-apart receiver coils coaxially mounted relative to the transmitter coil but longitudinally separated therefrom. Powered by either a pulsed signal or a CW signal in the frequency range of 5–500 kilohertz (kHz), at a potential on the order of 100 volts, the transmitter radiates a magnetic field in the surrounding formation. The magnetic field induces eddy currents in the formation which are detected by one or more receivers. The magnitude of the induced potential, on the order of nanovolts, is a function of the formation conductivity.

Quantities of interest in certain applications are the amplitude and the phase of the received signals with respect to the current in the transmitter. In order to measure the signal caused by the eddy currents in the formation, it is necessary to cancel the large direct-coupled signal between transmitter and receiver coils.

A typical sonde is about 9 cm in diameter and 4 to 5 meters long. The sonde is constructed of non-magnetic material which also may be nonconductive such as fiberglass. In the simplest arrangement, a transmitter coil is provided at one end of the sonde. The receiver coils of a set may be 0.05 to 1.5 meters apart and separated from the transmitter coil by 0.1 to 3.0 meters.

The simplest configuration for an induction instrument is a two-coil system consisting of a single transmitter and a single receiver coil. In that configuration, the direct coupled signal, i.e. the signal present even in a non-conductive environment can exceed the signal sensitive to the presence of earth formations by four orders of magnitude. Typically, we wish to measure signals in formations characterized by a conductivity as low as 1 millisiemen/meter (mS/m). In the frequency range typically used, the direct coupled signal may range from 1 to 10 S/m. We are interested in the signal that is out of phase with respect to the direct coupled signal. That requires a phase measurement accuracy of 0.0006 degree. Furthermore, we are interested in the formation signal that is in phase with the direct coupled signal which desideratum requires an instrumental stability of one part in 100,000. Such precision is not presently achievable. For that reason, practical induction tools include at least one additional receiver coil that is wound in series with the first coil and positioned so that the direct coupled signal is approximate equal and opposite to the signal from the first coil, thereby to null the direct-coupled field. See for example, U.S. Pat. No. 4,873,488, issued Oct. 10, 1989 to T. D. Barber et al.

The direct-coupled field strength is very sensitive to the longitudinal position of the receiver coil with respect to the transmitter coil, being proportional to $1/d^3$ where d is the receiver-transmitter distance. Therefore, a very small longitudinal shift results in a relatively large change in the nulling effect, thus necessitating critical adjustment of the receiver-coil position. Customarily, the coil mounting arrangement includes means for spacing the coils using shims on the order of 0.0003 centimeter in thickness and thereafter locking the coil in place, all of which requires very tight manufacturing tolerances.

In more complex arrangements, such as when two transmitters are used or where an array of several sets of variously-spaced receiver coils are used, spacing of the various coils becomes very laborious since the adjustment of one shim may affect the adjustment of others.

There is a need for a less critical yet effective means for balancing the electrical outputs of the respective receiver coils of an array of one or more sets of receiver coils mounted in an induction logging tool.

SUMMARY OF THE INVENTION

This invention includes an induction logging tool for use in a borehole that consists of an elongated non-magnetic mandrel including at least one transmitter coil axially wound around the mandrel at a preselected location on the mandrel. At least one set of two spaced-apart series-connected receiver coils, co-axially wound around the mandrel, are spaced longitudinally apart from the transmitter coil by a predetermined distance. An equalization means is provided for zeroing the total signal detected by the set of receiver coils in the presence of electromagnetic radiation emitted from the transmitter coil when the tool is immersed in a medium having substantially zero conductivity.

In one embodiment, the equalization means is a magnetic ferrite body slidably mounted within the receiver coils of the set.

In another embodiment, the equalization means is a highly electrically-conductive metallic body slidably mounted within the receiver coils of the set.

In another aspect of this invention, the tool includes an array of sets of receiver coils, each set including an equalization means slidably mounted between the coils of each set.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2 illustrates a schematic diagram of the essential electrical configuration of the sonde;

FIG. 3 is a longitudinal cross section of the sonde shown in FIG. 1; and

DETAILED DESCRIPTION OF THE PRESENTLY PREFERRED EMBODIMENT

Figure 1:
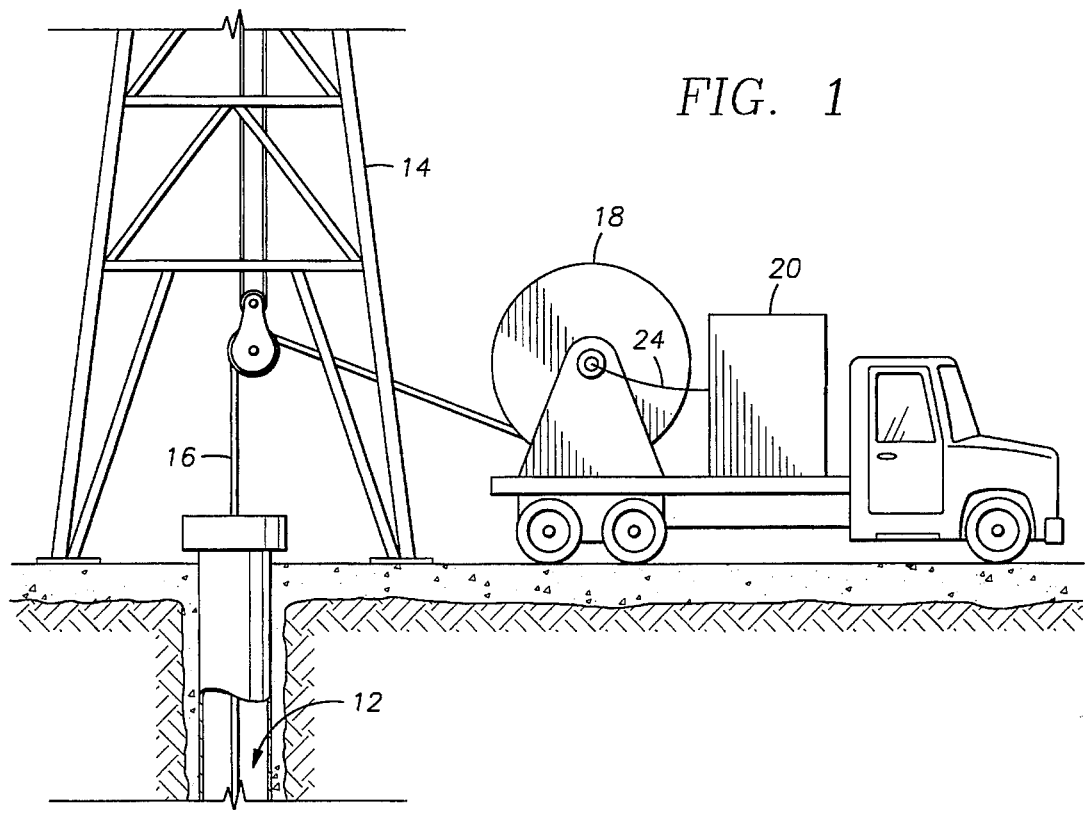
FIG. 1 is an illustration of an induction sonde suspended in a borehole.

FIG. 1 shows an induction sonde 10 suspended in a borehole 12 by a cable 14 beneath derrick 16. The induction sonde 10 is moved through the borehole 12 by draw works 18. Surface control and data-retrieval electronics 20 communicate with an electronics package 22 (FIG. 2) in sonde 10 through connecting leads 24 and electrical conductors (not shown) in cable 14.

FIG. 2 is a schematic diagram showing the electrical configuration of the transmitter coil, the receiver coils, and the essential electronics packages.

Sonde 10 includes a transmitter coil 26, a first set of receivers 28 and 30 and a second set of receivers 34 and 36. A third set of receivers 35 and 37 may be provided if desired. The first and second sets of receivers comprise an array of receivers relative to transmitter 26 when that transmitter is radiating. Electrical output signals from the receiver coils are processed in pre-amplifier 29 and phase detector 31. Transmitter 26 is powered by a self-contained transmitter electronics module 27.

FIG. 3 illustrates the mechanical details of sonde 10 in longitudinal half-section. Transmitter coil 26 is wound on a ceramic coil form 40 which is mounted on an inner non-magnetic mandrel 42 that is co-axial with an outer protective non-magnetic sleeve 44. Electrical conductors (not shown) from transmitter coil 26 pass to electronics module 27 through a suitable conduit such as 48. A longitudinally-slotted Faraday shield 50 inhibits longitudinal electrical fields but does not distort longitudinally propagating magnetic fields.

Receiver coils 28 and 30 are series-wound on coil form 52 which is mounted co-axially on inner mandrel 42. Coil 28 has fewer turns than does coil 30 in proportion to the cube root of the relative spacings from the transmitter coil 26. The spacing between receiver coils 28 and 30 is approximated for balanced electrical output from the two coils when the transmitter radiates an electromagnetic field in air. The signal output conductors (not shown) pass to electronics package 22 through a conduit such as 48. A Faraday shield 58 covers the first set of receiver coils. A second set of coils 34 and 36 are provided on coil form 53 as shown, shielded by Faraday shield 59.

Vernier adjustment means for balancing the electrical outputs of the receiver coils 28 and 30 is provided by equalization means such as 61 and 63 which are slidably mounted in slots 62 and 64 of coil form 52 between the two receiver coils. Similarly, equalization means 65 and 67 slide in slots 68 and 79 to service receiver coils 34 and 36.

Preferably, equalization means such as 61, 63, 65 and 67 are small bodies of magnetic or electrically conductive material on the order of 0.25 inch in diameter and about 0.5 inch long. If magnetic, they may be of ferrite having an initial permeability on the order of 100. The effect of the magnetic body is to alter the strength or distribution of the magnetic flux within one or both receiver coils to change the strength of the coupled signal thereby to null the signal outputs. That function is done by placing the body inside the coil and varying its position longitudinally within the coil. Preferably, the disturbance created by the equalization means is substantially in phase with the direct-coupled signal.

The desired effect can be achieved by use of material having very high relative magnetic permeability and very low conductivity such as ferrite as above stated. Alternatively, an electrically highly-conductive metallic body could be used. The preferred body should have a resistivity of 2.0 $\mu\Omega$/cm or less and very low relative permeability such as copper or silver.

Figure 4:
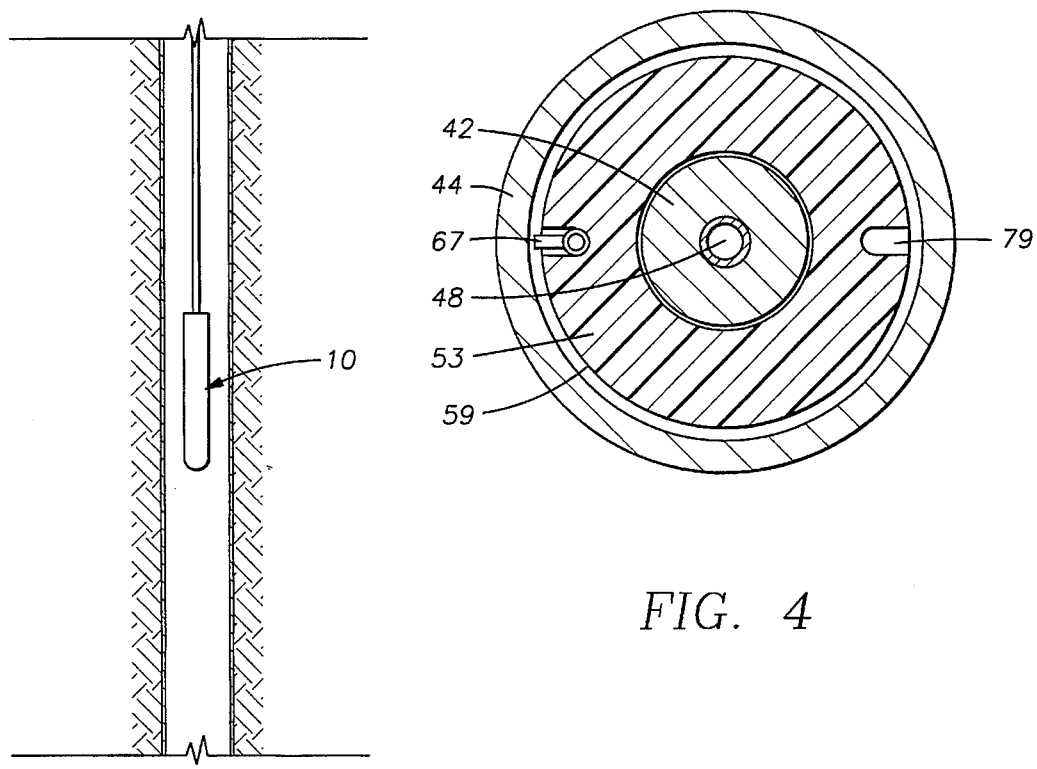
FIG. 4 is a cross section along lines 4—4 of FIG. 3.

FIG. 4 is a cross section along line 4—4 of FIG. 3, showing inner mandrel 42 and outer sleeve 44, coil form 53 and Faraday shield 59. The coils are not visible in this view. Preferably, at least one equalization device such as 65 is used to alter the electromagnetic field to be associated with receiver coil 36. A plurality of such devices may be used for each coil if required.

It is well known that the effective permeability as a function of the initial permeability of the body is related to the shape and aspect ratio R (ratio of length to diameter) of a ferrite material. It has been experimentally established that the effective permeability $\mu$ of a magnetic body is related to the initial permeability $v$ and a demagnetizing coefficient D such that $$\mu=v/(1+D\{v-1\}).$$

For high values of $v$, $\mu$ is virtually independent of that quantity and assumes the reciprocal value of the demagnetization coefficient D. The effective permeability then is a function of only the shape of the magnetic body. That fact can be used to ensure the temperature stability of the equalization system.

For rods, it is well known that D depends on the aspect ratio R and has a weak dependence on $v$. For $v>100$ and $R<7$, D and hence $\mu$ is independent of $v$. For ellipsoids, D is completely independent of $v$. Proper selection of the shape and materials used to prepare the equalization means assures that the system will be independent of temperature.

The description has been described by way of example but not by way of limitation with respect to a single set of receivers. However, each receiver set of the array may be configured as above described.

In operation, the induction logger is mounted on a test fixture, immersed in a medium having substantially zero conductivity such as air. The transmitter is activated at its rated operating voltage. The outputs of the two receiver coils may be processed by any suitable signal detection system for analytical comparison. The coils are balanced by placing one or more equalization bodies, magnetic or electric, partially or completely within the confines of one or both the coils. The total output signal is nulled by changing the fraction of the length of the body that lies within the coil. The rod is small compared to the coil; its effect is very localized. Because its effect is relatively small, a vernier adjustment of the field strength does not require critical shifts of the equalizing body as required by the critical coil shifting required without the use of an equalizing body. The equalization means are shifted longitudinally with respect to the respective receiver-coil axes until the detection system indicates that the outputs cancel.

This invention has been described with a certain degree of specificity by way of example but not by way of limitation. Those skilled in the art will conceive of variations of this teaching but which will be embraced by the scope and spirit this invention which is limited only by the appended claims.

We claim as our invention:

1. In an induction logging tool for measuring formation conductivity components including an elongated mandrel, a transmitting coil axially mounted of said mandrel, at least one set of two spaced-apart receiver coils wound in series, co-axially mounted on said mandrel and longitudinally spaced from said transmitter coil, an improved vernier calibration method, comprising:

exciting said receiver coils with electromagnetic radiation originating from said transmitter coil;

nulling the total directly-coupled output signal from said receiver coils by controllably altering the magnetic flux distribution associated with said receiver coils including the step of selectively positioning a magnetic signal equalization body that is longitudinally slidingly mounted between said receiver coils, said magnetic signal equalization body being a magnetic rod having an aspect ratio selected to minimize the dependence of the effective permeability of the rod on the initial permeability of the rod.

2. The induction logger as defined by claim 1, wherein said flux equalization body includes at least one highly-conductive metallic body longitudinally slidably-mounted between said receiver coils.

3. The induction logger as defined by claim 1 wherein, said induction logger includes a plurality of sets of receivers, each set being provided with a selected flux equalization body.

4. The induction logger as defined by claim 3, comprising: more than one series-connected transmitter coils distributed at desired intervals along said mandrel.

5. The induction logger as defined by claim 4, wherein: each said set of receiver coils includes three series-connected coils.

6. The induction logger as defined by claim 1, wherein: said magnetic equalization body is an ellipsoid having an aspect ratio selected to minimize the dependence of the effective permeability on the initial permeability.

* * * * *